US010338190B2

(12) United States Patent
Khan et al.

(10) Patent No.: US 10,338,190 B2
(45) Date of Patent: Jul. 2, 2019

(54) ENABLING A VALIDATION OF AN ESTIMATED POSITION OF A MOBILE DEVICE

(71) Applicant: HERE GLOBAL B.V., Eindhoven (NL)

(72) Inventors: Muhammad Irshan Khan, Tampere (FI); Jari Syrjärinne, Tampere (FI); Pavel Ivanov, Tampere (FI)

(73) Assignee: HERE Global B.V., Eindhoven (NL)

( * ) Notice: Subject to any disclaimer, the term of this patent is extended or adjusted under 35 U.S.C. 154(b) by 69 days.

(21) Appl. No.: 15/558,657

(22) PCT Filed: Mar. 17, 2015

(86) PCT No.: PCT/EP2015/055483
§ 371 (c)(1),
(2) Date: Sep. 15, 2017

(87) PCT Pub. No.: WO2016/146164
PCT Pub. Date: Sep. 22, 2016

(65) Prior Publication Data
US 2018/0113189 A1 Apr. 26, 2018

(51) Int. Cl.
*H04W 64/00* (2009.01)
*G01S 5/02* (2010.01)

(52) U.S. Cl.
CPC .......... *G01S 5/0252* (2013.01); *G01S 5/0236* (2013.01); *G01S 5/0278* (2013.01); *H04W 64/00* (2013.01)

(58) Field of Classification Search
CPC ... H04W 64/00; H04W 4/021; H04W 84/005; H04W 4/025; H04W 64/003;
(Continued)

(56) References Cited

U.S. PATENT DOCUMENTS 8,412,239 B1 4/2013 Palanki et al.
2006/0128311 A1 6/2006 Tesfai
(Continued)

FOREIGN PATENT DOCUMENTS

CN 103458502 A 12/2013
WO WO 2015/024758 A1 2/2015
(Continued)

OTHER PUBLICATIONS

International Search Report and Written Opinion for Application No. PCT/EP2015/055483 dated Dec. 15, 2015, 9 pages.
(Continued)

*Primary Examiner* — Quan M Hua
(74) *Attorney, Agent, or Firm* — Alston & Bird LLP

(57) ABSTRACT

An apparatus obtains results of measurements by a mobile device on radio signals transmitted by a plurality of transmitters, the results of measurements comprising characteristics of the radio signals at the location of measurement. The apparatus estimates a position of the mobile device based on the obtained results of measurements and based on assistance data including information on expected characteristics of radio signals of various transmitters at various locations. The apparatus matches a distribution of characteristics of radio signals in the obtained results of measurements with a reference distribution of characteristics of radio signals. Alternatively or in addition, the apparatus determines matching transmitters for which characteristics are available in the results of measurements and in the assistance data, and matches a determined expected distribution for the matching transmitters with a predetermined reference distribution. A result of any matching is provided as an indication of the validity of the estimated position.

23 Claims, 7 Drawing Sheets

(58) Field of Classification Search
CPC ....... H04W 4/029; H04W 4/02; H04W 4/023;
H04B 17/27; H04B 17/318; H04N
21/44227; H04M 1/72572; H04M
2250/10; H04M 2250/12; H04M 2250/52
See application file for complete search history.

(56) References Cited

U.S. PATENT DOCUMENTS

| | | |
|---|---|---|
| 2007/0178914 A1 | 8/2007 | Montenegro |
| 2011/0153632 A1* | 6/2011 | Meyer .................. G01C 21/30 707/758 |
| 2011/0319097 A1 | 12/2011 | Wirola et al. |
| 2013/0162481 A1 | 6/2013 | Parvizi et al. |
| 2013/0310066 A1* | 11/2013 | Shu ...................... H04W 64/00 455/456.1 |
| 2014/0236476 A1 | 8/2014 | Khorashadi et al. |
| 2014/0341198 A1 | 11/2014 | Han |
| 2017/0134899 A1* | 5/2017 | Chan .................... H04W 64/00 |

FOREIGN PATENT DOCUMENTS

| | | |
|---|---|---|
| WO | WO 2016/086993 A1 | 6/2016 |
| WO | WO 2016/086994 A1 | 6/2016 |

OTHER PUBLICATIONS

Buchman, A. et al., *Received Signal Strength Based Room Level Accuracy Indoor Localisation Method*, 2003 IEEE 4th International Conference on Cognitive Infocommunications (Dec. 2-5, 2013) 103-108.

* cited by examiner

ENABLING A VALIDATION OF AN ESTIMATED POSITION OF A MOBILE DEVICE

FIELD OF THE DISCLOSURE

The invention relates to the field of positioning and more specifically to enabling a validation of an estimated position of a mobile device.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BTLE) based positioning solutions, and wireless local area network (WLAN) based positioning solutions.

A WLAN based positioning solution, for instance, may be divided in two stages, a training stage and a positioning stage.

In the training stage, learning data is collected. The data may be collected in the form of fingerprints that are based on measurements by mobile devices. A fingerprint may contain a location estimate and measurements taken from the radio interface. The location estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. Alternatively or in addition, mobile devices may be used for collecting fingerprints in a systematic manner Collected fingerprint data may be uploaded to a database in a server or in the cloud, where algorithms may be run to generate radio models of WLAN access points and/or radio maps for positioning purposes.

In the positioning stage, a mobile device may estimate its current location based on own measurements taken from the radio interface and on the data or a subset of data that is available from the training stage. Model data or radio map data that has been generated in the training stage may be transferred to mobile devices as assistance data for use in position determinations. Alternatively, model data and/or radio map data may be stored in a positioning server to which the mobile devices may connect to for obtaining position information. In addition to the current location of the mobile device, the available data may be used in the positioning stage for estimating other position related information, like velocity and heading of the mobile device.

A similar approach could be used for a positioning that is based on other types of terrestrial transmitters or on a combination of different types of terrestrial transmitters.

SUMMARY OF SOME EMBODIMENTS OF THE INVENTION

For a first aspect of the invention, an example embodiment of a method comprises, performed by at least one apparatus, obtaining results of measurements by a mobile device on radio signals transmitted by a plurality of transmitters, the results of measurements comprising characteristics of the radio signals at the location of measurement. The method further comprises estimating a position of the mobile device based on the obtained results of measurements and based on assistance data including information on expected characteristics of radio signals of various transmitters at various locations. The method further comprises matching a distribution of characteristics of radio signals in the obtained results of measurements with a reference distribution of characteristics of radio signals. The method further comprises providing a result of the matching as an indication of validity of the estimated position.

For a second aspect of the invention, an example embodiment of a method comprises, performed by at least one apparatus, obtaining results of measurements by a mobile device on radio signals transmitted by a plurality of transmitters, the results of measurements comprising characteristics of the radio signals at the location of measurement. The method further comprises estimating a position of the mobile device based on the obtained results of measurements and based on assistance data including information on expected characteristics of radio signals of various transmitters at various locations. The method further comprises determining matching transmitters for which characteristics of radio signals are available in the results of measurements and for which information on expected characteristics of radio signals at the estimated position are available in the assistance data. The method further comprises determining a distribution of characteristics of radio signals of the matching transmitters at the estimated position based on the information on expected characteristics of radio signals of the matching transmitters in the assistance data to obtain an expected distribution for the matching transmitters. The method further comprises matching the determined expected distribution for the matching transmitters with a predetermined reference distribution of characteristics of radio signals. The method further comprises providing a result of the matching as an indication of validity of the estimated position.

An example embodiment of a first apparatus according to the invention comprises means for performing the actions of any embodiment of the example method presented for the first aspect of the invention and/or for the second aspect of the invention.

The means of the first apparatus may be implemented in hardware and/or software. They may comprise for instance a processor for executing computer program code for realizing the required functions, a memory storing the program code, or both. Alternatively, they may comprise for instance a circuit that is designed to realize the required functions, for instance implemented in a chipset or a chip, like an integrated circuit.

An example embodiment of a second apparatus according to the invention comprises at least one processor and at least one memory including computer program code, the at least one memory and the computer program code configured to, with the at least one processor, cause the apparatus at least to perform the actions of any embodiment of the example method presented for the first aspect of the invention and/or for the second aspect of the invention.

Any of the described apparatuses may comprise only the indicated components or one or more additional components.

Moreover an example embodiment of a system is presented, which comprises any embodiment of any example apparatus presented for the first aspect of the invention and/or for the second aspect of the invention. The apparatus is one of the mobile device and a server. The system further comprises a server, in case the apparatus is the mobile device; and the system further comprises the mobile device, in case the apparatus is a server. Optionally, the system may further comprise various other components.

Moreover an example embodiment of a non-transitory computer readable storage medium is presented, in which computer program code is stored. The computer program code causes an apparatus to perform the actions of any embodiment of the example method presented for the first aspect of the invention and/or for the second aspect of the invention when executed by a processor.

The computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that any embodiment of the computer program code by itself has to be considered an example embodiment of the invention as well. The computer program code could also be distributed to several computer readable storage mediums.

In certain embodiments, any of the presented methods is an information providing method, and any of the presented first apparatuses is an information providing apparatus. In certain embodiments, the means of the presented first apparatus are processing means.

In certain embodiments, any of the presented methods is a method for enabling a validation of an estimated position of a mobile device. In certain embodiment, any of the presented apparatuses is an apparatus for enabling a validation of an estimated position of a mobile device.

It is to be understood that any feature presented for a particular exemplary embodiment may also be used in combination with any other described exemplary embodiment of any category.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
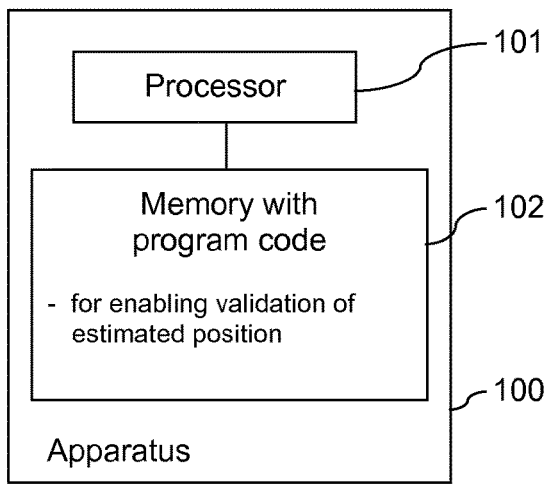
FIG. 1 is a schematic block diagram of an example embodiment of an apparatus.

FIG. 1 is a schematic block diagram of an example embodiment of an apparatus 100 according to the invention. Apparatus 100 comprises a processor 101 and, linked to processor 101, a memory 102. Memory 102 stores computer program code for enabling a validation of an estimated position of a mobile device in line with the first aspect and/or the second aspect. Processor 101 is configured to execute computer program code stored in memory 102 in order to cause an apparatus to perform desired actions.

Apparatus 100 could be a stationary device, like a positioning server or some other server, or a mobile device, like a mobile communication device. A stationary device is configured to be stationary when in operation. A mobile device is configured to enable operation while the device is moving. Apparatus 100 could equally be a module, like a chip, circuitry on a chip or a plug-in board, for a device. Optionally, apparatus 100 could comprise various other components, like a data interface, a user interface, a further memory, a further processor, etc. If the apparatus is a server, it could be a server that is configured to obtain results of measurements from mobile devices.

An operation of apparatus 100 will now be described with reference to the flow chart of FIG. 2. The operation is an example embodiment of a method according to the first aspect of the invention. Processor 101 and the program code stored in memory 102 cause an apparatus to perform the operation when the program code is retrieved from memory 102 and executed by processor 101. The apparatus that is caused to perform the operation may be apparatus 100 or some other apparatus, for example but not necessarily a device comprising apparatus 100.

The apparatus obtains results of measurements by a mobile device on radio signals transmitted by a plurality of transmitters, the results of measurements comprising characteristics of the radio signals at the location of measurement. (action 201)

The apparatus furthermore estimates a position of the mobile device based on the obtained results of measurements and based on assistance data including information on expected characteristics of radio signals of various transmitters at various locations. (action 202)

The apparatus furthermore matches a distribution of characteristics of radio signals in the obtained results of measurements with a reference distribution of characteristics of radio signals. (action 203)

The apparatus furthermore provides a result of the matching as an indication of validity of the estimated position. (action 204) The result of the matching may be provided in various forms. It may comprise for instance simply an indication whether or not the estimated position is valid, or it may comprise information on the degree of validity. It may be provided for evaluation within the apparatus or for evaluation external to the apparatus.

The invention proceeds from the consideration that the possibility to validate an estimated position of a mobile device may be important for various use cases. For example, a position may be estimated by finding the best match between characteristics of detected radio signals and characteristics of radio signals that are expected at various locations based on available assistance data. The location with the best match may be used as a position estimate. However, sometimes, also the best match may be no good estimate, and an associated covariance may be misleadingly small. For instance, if assistance data is provided for a certain geographical site, like a building, and a user visits an area outside of this site, it may still be possible to find a match, since a mobile device of the user may be able to detect signals from the same transmitters within the side and outside of the site. However, the position estimate and associated uncertainty values, e.g. in the form of a covariance matrix, will correspond to a location within the site. The associated uncertainties may increase outside of the site, but this is because of the unavailability of measurements on radio signals of some transmitters, not because of a mismatch. In certain approaches, the uncertainties may be scaled based on time, i.e. if usable measurements are not available then the uncertainties are increased based on time. Most of the time, however, the assumed uncertainties are very optimistic, even when the estimated location is far from the actual location. Wrong position estimates may result in a poor user experience, when the position estimate is used, for example, by positioning, tracking or navigation applications. Wrong position estimates may also be problematic to filters, which are used to fuse information from different sensors based on their covariance values.

Certain embodiments of the invention therefore provide that the distribution of characteristics of radio signals that are measured at a mobile device is matched with an expected distribution to obtain an indication of validity, in order to obtain information on the validity of a position that has been estimated based on these characteristics.

Certain embodiments of the invention may have the effect that they enable a validation of an estimated position. Certain embodiments of the invention may have the effect that they ensure that certain applications that rely on accurate position information can be provided only with position information that can be assumed to be valid. Certain embodiments of the invention may have the effect that they ensure that certain applications receive reliable information on a position, like a position estimate along with reliable uncertainty values. Certain embodiments of the invention may have the effect that they allow improving the overall performance of such applications and/or the user experience with such applications. In certain embodiments of the invention, the result of the matching may be considered to quantify the effectiveness of assistance data for a particular radio scan, i.e. for results of measurements by a mobile device at a particular measurement location.

Figure 2:
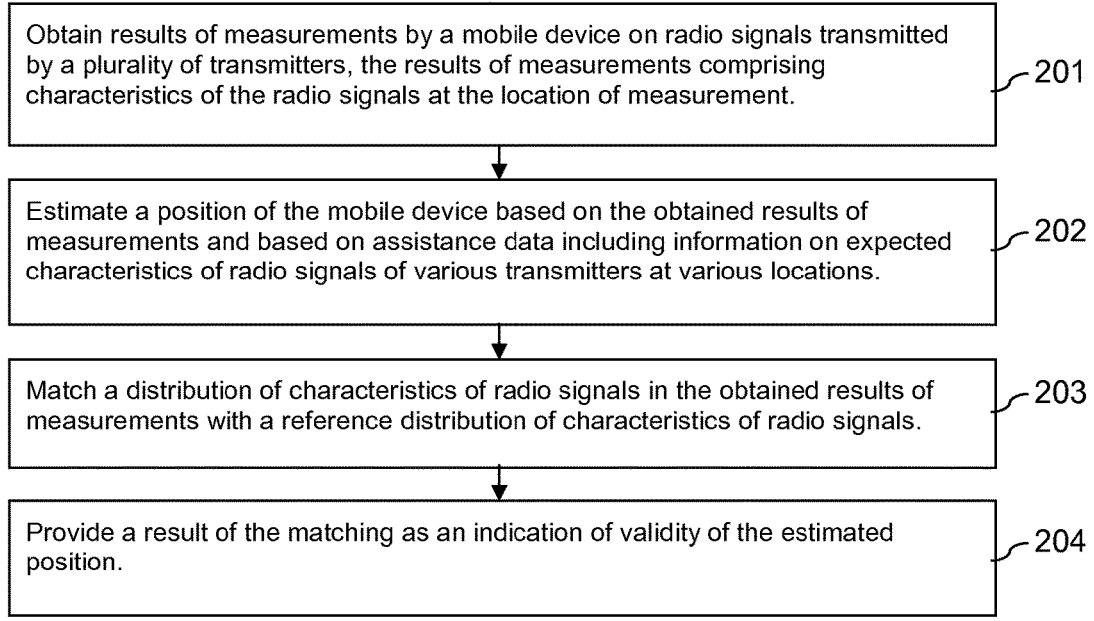
FIG. 2 is a flow chart illustrating an example embodiment of a method according to the first aspect.

Apparatus 100 illustrated in FIG. 1 and the method illustrated in FIG. 2 may be implemented and refined in various ways.

The reference distribution may be predetermined or computed individually for each matching.

In an example embodiment, the reference distribution is defined by predetermined global distribution values for a plurality of geographical sites. This may have the effect that such values may be stored and readily available whenever needed. A single set of distribution values will also need little storage space. In a variation, the reference distribution is defined by predetermined distribution values for a particular geographical site. This may have the effect that the reference distribution may correspond well to the actual distribution of expected radio signals at the site. In a further variation, the reference distribution is defined by predetermined distribution values for a particular geographical location, for example a location in a particular geographical site, corresponding to the estimated position. This may have the effect that the reference distribution may correspond well to the actual distribution of expected radio signals specifically at the estimated position. Any kind of predetermined distribution values for a particular geographical site may be updated, for example, whenever the assistance data for the site is updated. Using predetermined distribution values may generally have the effect that time, processing resources and energy is saved that would be required for computing the reference distribution individually each time it is required. This may be of particular benefit, for instance, if the distributions are matched by a mobile device while the predetermined distribution values are determined in advance by a server. In a further variation, the reference distribution is defined by distribution values computed for expected characteristics of radio signals of selected transmitters at the estimated position, the selected transmitters being transmitters for which characteristics are included in the results of measurement. This may have the effect that the considered reference distribution corresponds exactly to an expected reference distribution at the location of the estimated position and may thus provide the most accurate results.

In an example embodiment, the distribution of characteristics of radio signals in the obtained results of measurements is defined by a mean of the characteristics and a standard deviation of the characteristics, and the reference distribution of characteristics of radio signals is defined by a reference mean and a reference standard deviation. Each mean may be computed in any suitable manner, for example, though not exclusively, as a sample mean. Each standard deviation may be computed in any suitable manner, for example, though not exclusively, as a sample standard deviation. Using mean and standard deviation may have the effect that they are easy to compute and that they are suited to completely define a normal distribution, which may constitute a good model for the actual distribution.

In an example embodiment, matching a distribution of characteristics of radio signals in the results of measurements with a reference distribution comprises determining matching transmitters for which characteristics are available in the results of measurements and for which information on expected characteristics at the estimated position are available in the assistance data. It further comprises computing distribution values for the characteristics of radio signals of the matching transmitters from the results of measurements to obtain estimated distribution values. It further comprises computing distribution values for characteristics of radio signals of the matching transmitters based on the information on expected characteristics of the matching transmitters at the estimated position in the assistance data to obtain reference distribution values. It further comprises computing a covariance of the reference distribution values to obtain a reference covariance. It further comprises computing a probability density function based on the estimated distribution values, the reference distribution values and the reference covariance. It further comprises computing a scaling constant based on the probability density function. It further comprises computing a covariance of the estimated distribution values. Finally, it comprises scaling the covariance of the estimated distribution values using the computed scaling constant to obtain a valid covariance of the estimated position.

In an alternative example embodiment, predetermined reference distribution values and a predetermined reference covariance are employed. In this case, matching a distribution of characteristics of radio signals in the results of measurements with a reference distribution comprises determining matching transmitters for which characteristics are available in the results of measurements and for which information on expected characteristics at the estimated position are available in the assistance data. It further comprises computing distribution values for the characteristics of radio signals of the matching transmitters from the results of measurements to obtain estimated distribution values. It further comprises obtaining predetermined reference distribution values for characteristics of radio signals. It further comprises obtaining a predetermined reference covariance for the reference distribution values. It further comprises computing a probability density function based on the estimated distribution values, the reference distribution values and the reference covariance. It further comprises computing a scaling constant based on the probability density function. It further comprises computing a covariance of the estimated distribution values. Finally it comprises again scaling the covariance of the estimated distribution values using the computed scaling constant to obtain a valid covariance of the estimated position, the expression valid covariance denoting a covariance that is considered to be valid.

Both alternatives may have the effect that an accurate covariance for the estimated position is obtained by scaling an original covariance, where the amount of scaling depends on how well the estimated distribution is matching with the reference distribution. An accurate covariance may provide information on the validity of the estimated position and/or be used as a basis for determining whether the estimated position is valid. It may result for example in a large covariance for estimated positions within a geographical site for which assistance data is available, in case the mobile device is located outside of the site.

Example embodiments of both alternatives further comprise determining whether the estimated position is valid by comparing the valid covariance with a threshold, wherein providing a result of the matching as an indication of validity of the estimated position comprises providing a result of the comparison. This may have the effect that an entity receiving the result of the matching knows immediately whether an estimated position may be used as an accurate position. The provided result of the comparison may also be used as a basis for providing the estimated position for use by a particular application only if determined to be valid.

Alternatively or in addition, providing a result of the matching as an indication on the quality of the estimated position may comprise providing the valid covariance, for instance together with the estimated position. This may have the effect that an entity relying on an accurate covariance of an estimated position for its operation may be provided with such an accurate covariance. An example for such an entity may be a filter which is used to fuse information from different sensors based on their covariance values.

Additional criteria may be used for determining the indication of the validity of the estimated position. An example embodiment comprises in addition determining matching transmitters for which characteristics of radio signals are available in the results of measurements and for which information on expected characteristics at the estimated position are available in the assistance data; determining a distribution of characteristics of radio signals of the matching transmitters at the estimated position based on the information on expected characteristics of radio signals of the matching transmitters in the assistance data to obtain an expected distribution for the matching transmitters; matching the determined expected distribution for the matching transmitters with a predetermined reference distribution of characteristics of radio signals to obtain a result of further matching; and combining the result of the matching with the result of the further matching to obtain the provided indication of validity of the estimated position. Using such a criterion in addition may have the effect that the validity of an estimated position may be determined even more reliably.

The considered characteristics of radio signals may be any kind of characteristics that allow estimating the position of a mobile device. In an example embodiment, the characteristics of the radio signals in the results of the measurements and the expected characteristics comprise signal strength related values and/or timing advance related values. A timing advance related value may indicate the length of a time that it takes a signal to reach the mobile device from the transmitter (or vice versa). Using a timing advance related value as characteristics may have the effect that it is readily available anyhow for some types of transmitters. Using received signal strength related values as characteristics may have the effect that such values can be determined for any kind of transmitter from which radio signals may be received. In any case, the results of measurements may comprise in addition an identification of the transmitters for which characteristics on radio signals are included. The term transmitter is to be understood in a broad sense, that is, either only as the actual transmitting entity or as any entity comprising the actual transmitting entity.

In an example embodiment, the plurality of transmitters comprises at least one terrestrial transmitter. In an example embodiment, the plurality of transmitters comprises at least one non-cellular terrestrial transmitter. The at least one non-cellular terrestrial transmitter could comprise any non-cellular ground based transmitter that is configured to transmit radio signals. In an example embodiment, it comprises at least one wireless local area network access point and/or at least one Bluetooth transmitter and/or at least one BTLE transmitter. It is to be understood that a Bluetooth transmitter and a BTLE transmitter could optionally be a part of a respective transceiver. WLAN and Bluetooth transmitter are already installed in many buildings. Furthermore, WLAN and Bluetooth technologies are already supported in many mobile user devices, like smartphones, tablets, laptops and in the majority of feature phones. Using WLAN access points, Bluetooth transmitters and/or BTLE transmitters as transmitters may thus have the effect that the supported positioning can be based on an existing infrastructure in buildings and on existing capabilities in mobile devices. As a result, the approach may be globally scalable and have low maintenance and deployment costs. The deployment of new infrastructure, including for example beacons and tags, is not necessary. In addition, the end-user experience may be acceptable with these technologies, since a horizontal positioning accuracy of 2-3 meters as well as close to 100% reliability in floor detection may be achieved. It is to be understood that the at least one transmitter could also comprise at least one cellular transmitter, like a base station of a cellular communication network. However, due to the narrow frequency bands of cellular signals, WLAN and Bluetooth nodes may generally enable a more accurate positioning. Furthermore, transmitters transmitting any other kind of wireless signals, including for instance ultra-wideband (UWB) signals or any wireless signals that might emerge in the future, may be used as well. The transmitters do not even have to be ground-based necessarily. For example, the transmitters could also comprise transmitters in a ship. In an example embodiment, the transmitters are stationary, either absolutely or relatively to a certain geographical site.

In an example embodiment, a result of the matching as an indication of validity of the estimated position is provided for transmission. This may have the effect that estimation and validation of a position of a mobile device may be decoupled from the use of the estimated position. Alternatively, the result of the matching as an indication of validity of the estimated position may be provided for use in the apparatus or in a device comprising the apparatus.

In an example embodiment, a result of the matching as an indication of validity of the estimated position is provided for use by an application. The application may be any kind of application that considers an estimated position of a mobile device, and in particular any application that is able to provide a better performance when enabled to consider only accurate estimated positions of a mobile device. The specific application may be for example a navigation application, and/or a tracking application, and/or an application matching positions of the mobile device to a map, and/or an application presenting a position of the mobile device to user on a display, and/or an application combining information from different sensors, for instance at least two motion sensors.

In an example embodiment, a result of the matching as an indication of validity of the estimated position is provided for supporting an assembly of assistance data. This may have the effect that it may be used as an indication, for which locations additional or updated data may be needed.

In an example embodiment, the apparatus is or belongs to the mobile device which measures the radio signals. This may have the effect that the mobile device may improve the quality of the operation of an application independently of a server. In an alternative example embodiment, the apparatus is or belongs to a server that is configured to obtain results of measurements on radio signals from mobile devices, for instance in the scope of positioning or tracking requests from the devices. This may have the effect that processing resources of the mobile device can be saved.

Figure 3:
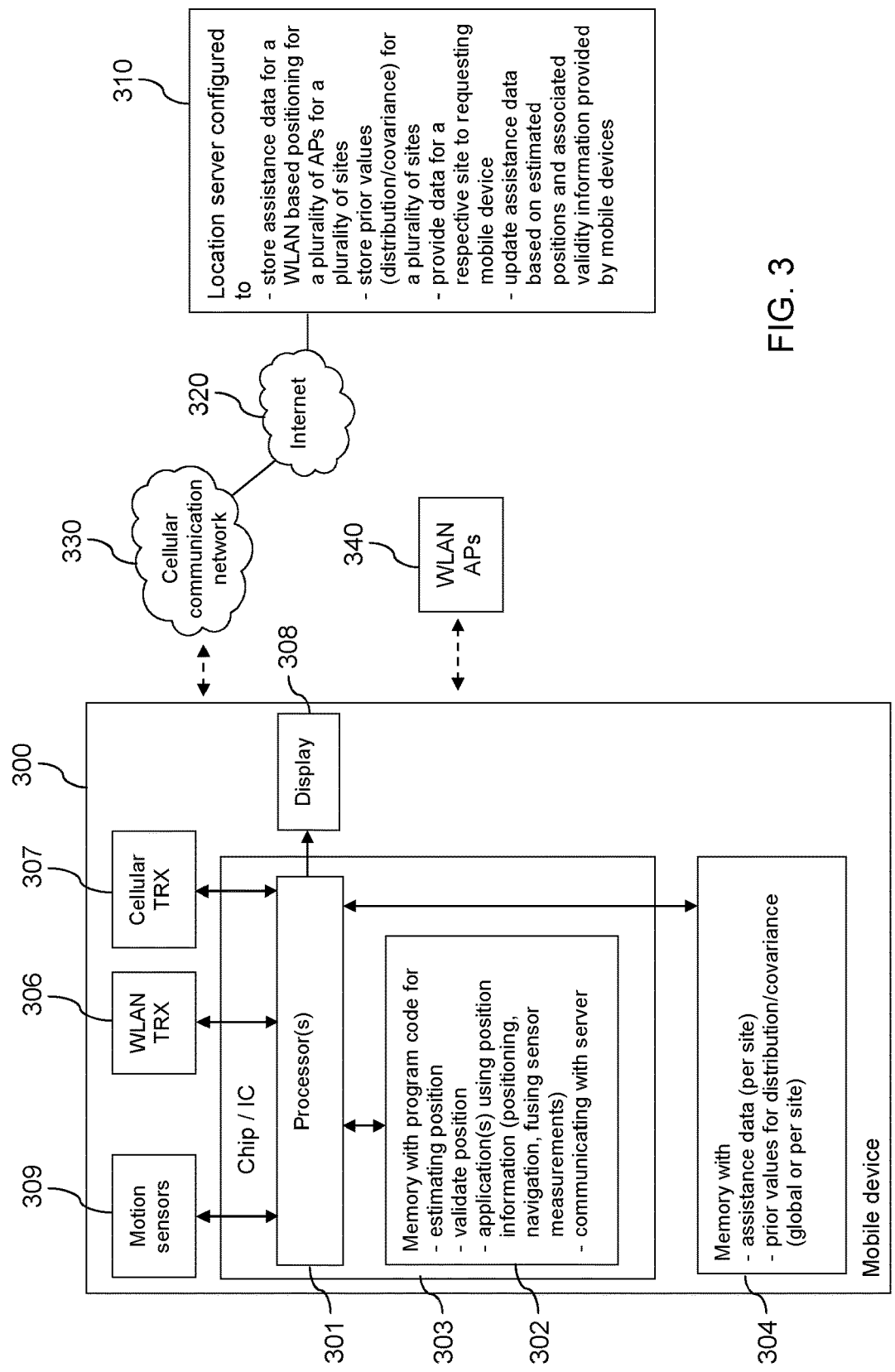
FIG. 3 is a schematic block diagram of a first example embodiment of a system.

FIG. 3 is a schematic block diagram of a first example embodiment of a system according to the invention, in which a mobile device is configured to validate a position estimate.

The system comprises a mobile device 300 and a location server 310. The system further comprises a network 320, by way of example the Internet. The system further comprises a cellular communication network 330 that is connected to the Internet 320. The system further comprises a number of WLAN access points (AP) 340.

Mobile device 300 may be for instance a mobile terminal, like a smartphone or a tablet PC. Mobile device 300 comprises a processor 301 that is linked to a first memory 302, to a second memory 304, to a WLAN component 306, to a cellular communication component 307, to a display 308 and other user input and output means, and to motion sensors 309.

Processor 301 is configured to execute computer program code, including computer program code stored in memory 302, in order to cause mobile device 300 to perform desired actions.

Memory 302 stores computer program code for estimating a position of mobile device 300 using stored assistance data, computer program code for validating estimated positions, and computer program code for communicating with server 310. Memory 302 also stores computer program code of one or more applications using position information, for example a tracking application or a navigation application. One of these applications or some other application may provide for a fusing of sensor measurements using position information. Some of the program code in memory 302 may be similar to the program code in memory 102. In addition, memory 302 could store computer program code configured to realize other functions. In addition, memory 302 could also store other kind of data.

Processor 301 and memory 302 may optionally belong to a chip or an integrated circuit 303, which may comprise in addition various other components, for instance a further processor or memory.

Memory 304 is configured to store assistance data for one or more geographical sites. By way of example, the assistance data comprises data of a grid based radio map for at least one site. A grid for a particular site may represent the geographical area of a site, with each grid point corresponding to a geographical location at the site. The data of a grid based radio map may then comprise for each grid point an identifier of each WLAN access point that may be expected to be observed at the location represented by the grid point and an indication of a received signal strength that can be expected to be observed at the location represented by the grid point. Memory 304 could be configured to store any other desired data as well, for example global prior values for an expected distribution of radio signal strength values and for an expected covariance, or prior values for an expected distribution of radio signal strength values and for an expected covariance for each of one or more sites.

WLAN component 306 includes at least a WLAN transceiver (TRX). WLAN component 306 enables mobile device 300 to perform radio measurements on radio signals that are broadcast by WLAN access points 340. In addition, it may enable mobile device 300 to establish a connection with WLAN access points 340 for accessing the associated WLAN. It is to be understood that any computer program code based processing required for a WLAN communication could be stored in an own memory of WLAN component 306 and executed by an own processor of WLAN component 306, or it could be stored for example in memory 302 and executed for example by processor 301.

Cellular communication component 307 includes at least a cellular transceiver. It enables mobile device 300 to communicate with other entities via cellular communication network 330, for example with server 310. It could be a cellular engine that is configured to take care of all processing required for a cellular communication. Alternatively, at least some of the processing that is required for a cellular communication may be realized by processor 301 executing corresponding additional program code stored in memory 302.

Display 308 could be a touchscreen or a display that is not touch sensitive.

Motion sensors 309 may comprise for example a gyroscope and/or magnetometers.

It is to be understood that mobile device 300 could comprise various other components, like various other user input means and speakers.

Component 303 or mobile device 300 could be an example embodiment of an apparatus according to the invention.

Location server 310 is a server that is configured to store assistance data for a WLAN based positioning. The assistance data may comprise for instance grid based radio map data for each of a plurality of geographical sites. Location server 310 may also be configured to store prior values for a plurality of sites. Location server 310 is also configured to provide stored data on sites to mobile devices via the Internet 320. Location server 310 may also be configured to receive position information determined by mobile devices via the Internet 320 and to update assistance data based on this information. Server 310 could comprise a memory for storing the assistance data and/or it could be configured to access an external memory storing the assistance data, optionally via another server.

Assistance data can be obtained in different ways by location server 310. It may be computed by location server 310 based on available information or it may be computed by some other server and provided to location server 310.

For generating grid data for a particular geographical site, for example, some server may receive fingerprint data that has been collected by a number of surveying devices at various measurement locations throughout the geographical site. Such fingerprint data may comprise for a respective geographical site an indication of the measurement location, an identifier of the WLAN access points from which signals are observed at this location and an indication of a received signal strength for each of the identified WLAN access points. The server may then map the results of measurements from the fingerprint data to grid points of one or more grids. In order to support a determination of a three dimensional position, a grid could be defined for different altitude values or for each floor of a building, if the site is a building. Each grid could be for example a uniformly spaced rectangular two-dimensional grid representing a geographical area that includes the area of one of the floors of the site. Each grid could have for instance grid step of 10 meters in each direction. The measurement results in each of the fingerprints could then be mapped to a grid point of the grids that is provided for one of the floors. Each grid point could represent a particular geographic location of the surveyed localization area and possibly of some surrounding area. The correct floor and thus the correct grid could be determined based on an altitude component in the location that is indicated in the respective fingerprint and on knowledge about the floor height in a building or on an input of a user of the surveying device. The grid point to which the measurement results of a particular fingerprint are mapped could be the grid point that corresponds to a real geographic location that is closest to the horizontal location indicated in the fingerprint. If the measurement results for the same WLAN access point from several fingerprints have to be mapped to the same grid point, an average value of the received signal strength could be used, for example. For all grid points of the grid to which no measurement results have been mapped, corresponding values may be determined by interpolation, as far as possible, and otherwise by extrapolation. The result can be considered to be a radio map, which indicates for various locations corresponding to a grid point an expected received signal strength value for one or more WLAN access points 340.

Alternatively, some server could compute parameter values of a path loss model for all relevant WLAN access points 340 based on available information. Such available information may comprise information from operators of WLANs at a respective geographical site about the location, employed transmission power and employed radio signal frequency of their WLAN access points. In this case, a path loss model may be defined by the indicated location of the WLAN access point, the indicated transmission power used by the WLAN access point and a path loss exponent that can be assumed with the given frequency. Alternatively or in addition, the available information may comprise fingerprint data that has been collected by a number of mobile devices at various measurement locations throughout the geographical site. In this case, a path loss model may be defined by an estimation of the location of the WLAN access point, an estimation of an apparent transmission power used by the WLAN access point for transmitting signals and an estimated path loss exponent. The parameter values for such a path loss model could be estimated for example using a standard radio signal propagation model and the Gauss-Newton algorithm for a non-linear fitting problem. Based on the generated path loss models, a set of expected signal strength values of WLAN access points could then be mapped to each grid point of a grid.

A set of grids for different altitudes or different floors at the same sites could also be considered a three dimensional grid.

Cellular communication network 330 could be any kind of cellular communication network, like a Global System for Mobile Communications (GSM), a CDMA2000, a Universal Mobile Telecommunications System (UMTS), or a long term evolution (LTE) based communication network.

The WLAN access points 340 could be access points of one or more WLANs. The WLAN or WLANs may but do not have to be connected to the Internet 320. The WLAN access points 340 are example transmitters according to the invention.

Figure 4:
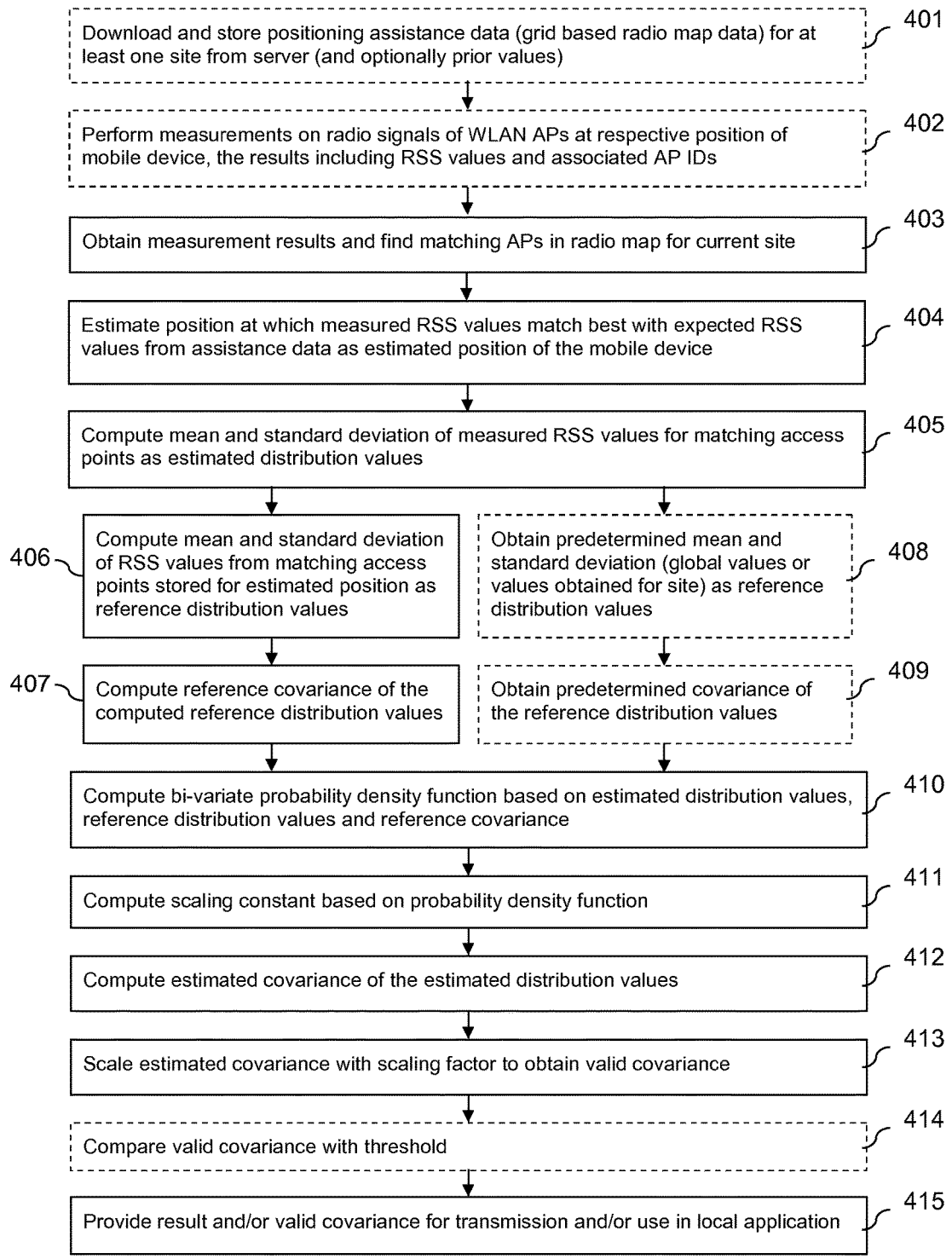
FIG. 4 is a flow chart illustrating example operations in the system of FIG. 3.

FIG. 4 is a flow chart illustrating example operations in the system of FIG. 3.

Processor 301 and some of the program code stored in memory 302 may cause mobile device 300 of FIG. 3 to perform the presented actions when the program code is retrieved from memory 302 and executed by processor 301.

In order to enable mobile device 300 to determine its position offline at certain geographical sites, for instance in a selected number of buildings, a user of mobile device 300 may request mobile device 300 to download positioning assistance data for these sites. Thereupon, mobile device 300 may download assistance data in the form of grid based radio map data for the selected sites from server 310 and store the data in memory 304 for immediate or future use. (action 401) Optionally, the assistance data may include for each site prior values for an expected distribution of received signal strength values and for an expected covariance. These values may be individual for the site, but common for all locations at the site.

When an application running on mobile device 300 needs information on the current position of mobile device 300, mobile device 300 triggers a measurement of radio signals, which are transmitted by WLAN access points 340 in the environment, by means of WLAN transceiver 306. Thereupon, WLAN transceiver 306 performs radio measurements at the current position of mobile device 300 to enable a WLAN based positioning of mobile device 300. The measurement results include for each access point that is observed at the current position an identifier (ID) of the access point and a signal strength related value indicating a measured signal strength of a signal transmitted by the identified access point. (action 402) The identifier of each access point may comprise, for example, a basic service set identification (BSSID), like the medium access control (MAC) address of the observed access point, and the service set identifier (SSID) of the observed access point. The signal strength related value may be an indication of a received signal strength (RSS), for example a received signal strength indicator (RSSI) or a physical Rx level in dBm with a reference value of 1 mW.

Mobile device 300 may now estimate its current position based on the obtained measurement results and on grid data that is stored in memory 304 as assistance data for the geographical site at which mobile device 300 is located. The site may be known for example from an input by the user of mobile device 300, or it may be determined based on some other type of positioning that is used otherwise by mobile device 300, like a satellite signal based positioning or a cellular based positioning.

For estimating its current position, mobile device 300 may first determine the access points for which indications of received signal strengths are included in the measurement results and find N matching access points for which received signal strength values are available in the radio map data for the currently visited site as well. (action 403)

The position is then estimated by determining the grid point of the grid(s) for the current site with the best match between the measured received signal strength values and the signal strength values that are assigned to a respective grid point for corresponding access points. The geographical location represented by the grid point with the best match is considered to be the estimated position of mobile device 300. (action 404) The estimated position may be a two dimensional position or a three dimensional position in any kind of coordinate system. It could comprise for instance an East coordinate and a North coordinate for a local East-North coordinate system. Alternatively, it could comprise for instance a Longitude value and a Latitude value of a geographic coordinate system. In the case of a three dimensional position, it may comprise in addition an altitude value or a floor number. In case there are several grids for the site, for instance one grid per floor, either data for all grids may be considered or one of the grids may be selected based on further information, like a user input indicating the floor on which the user is located.

Mobile device 300 then computes mean and standard deviation of the measured received signal strength values, as far as they belong to access points for which a match was found in the radio map data for the current site. (action 405)

The mean of N signal strength values $x_i$, with $i=1 \ldots N$, may be computed for example as sample mean $x_e$ using the following equation:

$$x_e = \frac{1}{N} \sum_{i=1}^{N} x_i$$

and the standard deviation may be computed for example as corrected sample standard deviation $\delta_e$ using the following equation:

$$\delta_e = \sqrt{\frac{1}{N-1} \sum_{i=1}^{N} (x_i - x_e)^2}$$

The resulting values are referred to as estimated distribution values $X_e$ with:

$$X_e = [x_e, \delta_e]$$

It is to be understood that instead of the corrected sample standard deviation, also the uncorrected sample standard deviation could be used. Using sample mean and sample standard deviation may be more effective than other approaches for determining mean and/or standard deviation.

Next, one of two alternatives may be used.

For a first alternative, mobile device 300 computes mean $x_r$ and standard deviation $\delta_r$ of signal strength values that are mapped to the grid point representing the geographical location that corresponds to the estimate position of mobile device 300, as far as the signal strength values are associated with access points for which received signal strength values are available in the obtained results of measurements. (action 406) The values can be computed in the same manner as the estimated distribution values in action 405. The resulting values are referred to as reference distribution values $X_r$ with:

$$X_r = [x_r, \delta_r]$$

For the first alternative, mobile device 300 computes in addition a reference covariance $P_r$ of the reference distribution values (action 407):

$$P_r = \begin{pmatrix} \delta_{x_r}^2 & \delta_{x_r} \delta_{\delta_r} \\ \delta_{\delta_r} \delta_{x_r} & \delta_{\delta_r}^2 \end{pmatrix}$$

For a second alternative, mobile device 300 relies on stored prior values. Mobile device 300 obtains a predetermined mean $x_r$ and a predetermined standard deviation $\delta_r$ as reference distribution values $X_r$ from memory 304. (action 408) The predetermined values can be global values that are stored permanently in mobile device 300. That is, the same mean and the same standard deviation would be selected for any site and any estimated position of mobile device 300. In this case, obtaining predetermined mean and standard deviation may simply consist in retrieving them from memory 304. In a variation, the predetermined values can be site specific values. They may be provided by server 310 in action 401 along with the grid data for a respective site. Such values may be computed by server 310 or by some other server individually for each site based on the available assistance data for the site. In this case, obtaining mean and standard deviation comprises selecting mean and standard deviation that are associated with a grid point corresponding to a current site at which mobile device 300 is located. Still, the same mean and the same standard deviation are selected for any estimated position of mobile device 300 within the site.

For the second alternative, mobile device 300 obtains in addition a predetermined reference covariance $P_r$ from memory 304. (action 409) As with the reference distribution values, the selected predetermined reference covariance may be a global covariance or a site specific covariance, which has been determined at some server based on the predetermined mean and predetermined standard deviation. A site specific predetermined covariance may also be provided by server 310 in action 401 along with the grid data for a respective site.

The further operations may be the same again for the both alternative.

Mobile device 300 computes a bi-variate probability density function Prob based on the estimated distribution values $X_e$, the reference distribution values $X_r$ and the reference covariance $P_r$ (action 410) as:

$$Prob = \frac{\exp\left(-\frac{1}{2}(X_e - X_r)' P_r^{-1}(X_e - X_r)\right)}{\sqrt{2\pi^2 |P_r|}}$$

The considered distribution may be a bi-variate normal distribution. Optionally, it may be a non-uniform bi-variate normal density function. The non-uniformity may result by saturating the probability values for values higher than a predefined threshold signal strength value.

Alternatively, the probability distribution may also be calculated, for example, using some other multivariate normal probability density function.

Next, mobile device 300 computes a scaling constant $S_P$ based on the probability density function (action 411) as:

$$S_P = \frac{1}{Prob * 100}$$

Mobile device 300 moreover computes a covariance of the estimated distribution values $X_e$ as an estimated covariance $P_{WLAN}$. (action 412) Covariance $P_{WLAN}$ may be calculated based on the normalized similarity measures (matching measure) between received signal strengths and expected signal strengths at different grid points of the grid(s) for a site. A similarity measure may be calculated as e.g. inverse of Euclidean norm between expected and received signal strengths (and 1 if norm is 0). Once similarity measures for different grid points have been calculated they are normalized and $P_{WLAN}$ may be calculated with the following formula:

$$P_{WLAN} = \begin{bmatrix} \sum_{i,j} s_{i,j}(g_1^* - g_1^{i,j})^2 & \sum_{i,j} s_{i,j}(g_1^* - g_1^{i,j})(g_2^* - g_2^{i,j}) \\ \sum_{i,j} s_{i,j}(g_1^* - g_1^{i,j})(g_2^* - g_2^{i,j}) & \sum_{i,j} s_{i,j}(g_2^* - g_2^{i,j})^2 \end{bmatrix},$$

where i, j are the indexes of grid points, $g_1^{i,j}$, $g_2^{i,j}$ are the coordinates of grid points, $s_{i,j}$ are the similarity measures of grid points, and $g_1^*$, $g_2^*$ are the coordinates of grid point with the best similarity measure (match). While the formula is given for a 2D case, for 3D cases an analogous formula may be used. It is to be understood that alternative approaches for calculating $P_{WLAN}$ may be used as well.

The scaling constant is thus determined based on how the distribution of received signal strengths indicated in the results of measurements is matching with a reference distribution.

$S_P$ is a valid scale for the estimated covariance $P_{WLAN}$, and it is used for scaling the estimated covariance $P_{WLAN}$ to obtain a valid covariance $P_{valid}$:

$P_{valid} = P_{WLAN} * I * S_P$ with $$I = \begin{bmatrix} 1 & 0 \\ 0 & 1 \end{bmatrix}$$

being the identity matrix. (action 413) If the estimated distribution is the same as the reference distribution, then no or very small changes are applied to the estimated covariance by the scaling. If the distributions are not matching at all, then the estimated covariance is scaled noticeably based on the calculated probability values.

$P_{valid}$ is a valid covariance of the estimated position of mobile device 300. It provides an indication whether the estimated position is valid or not. If the covariance $P_{valid}$ is high, it shows large uncertainties in the estimated position, which puts the validity of the estimated position in question.

The values of the computed covariance $P_{valid}$ may be compared for example with a threshold to determine whether the estimated position is valid or not. (action 414) If all values of matrix $P_{valid}$ fall short of the threshold values, then the estimated position is valid. If one of the values of $P_{valid}$ exceeds the threshold, the estimated position is not reliable and may have a quite large covariance.

It is to be understood that covariance $P_{valid}$ by itself already provides information on the quality of the position estimate. Thus, depending on the use case, action 414 may not be needed.

Mobile device 300 may provide a result of the computations for transmissions and/or for use by one or more local applications. (action 415)

The content of the provided result may be as needed.

For example, the result of the comparison with a threshold may be provided in action 515 for further use by the same application causing performance of actions 401 to 415. This application may use the result to provide an estimated position to some other internal or external application only, if it was determined to be valid. A tracking or navigation application, for example, may thus use only valid position estimates as input. A respective position of mobile device 300 and/or navigation instructions may be presented to a user on display 308. The user experience may improve, if only valid positions are considered by such applications.

In other cases, an indication whether the position is valid may be provided in action 515 along with the estimated position itself to some other internal or external application. Such information, if transmitted to server 310, may give a feedback to server 310 on the quality of positioning that is achieved with the provided assistance data. Server 310 or some other server may also use this information for a supplementary survey of the site. The areas where valid positions are difficult to estimate can be considered for collection of further data.

In yet another cases, the valid covariance $P_{valid}$ may be provided in action 515 along with the estimated position itself to some other internal or external application. To some applications of mobile device 300, the valid covariance may indicate how far the user is relative to the covered site. Furthermore, some applications of mobile device 300 fusing measurement results of motion sensors 309 may need such a valid covariance for proper operation.

Figure 5:
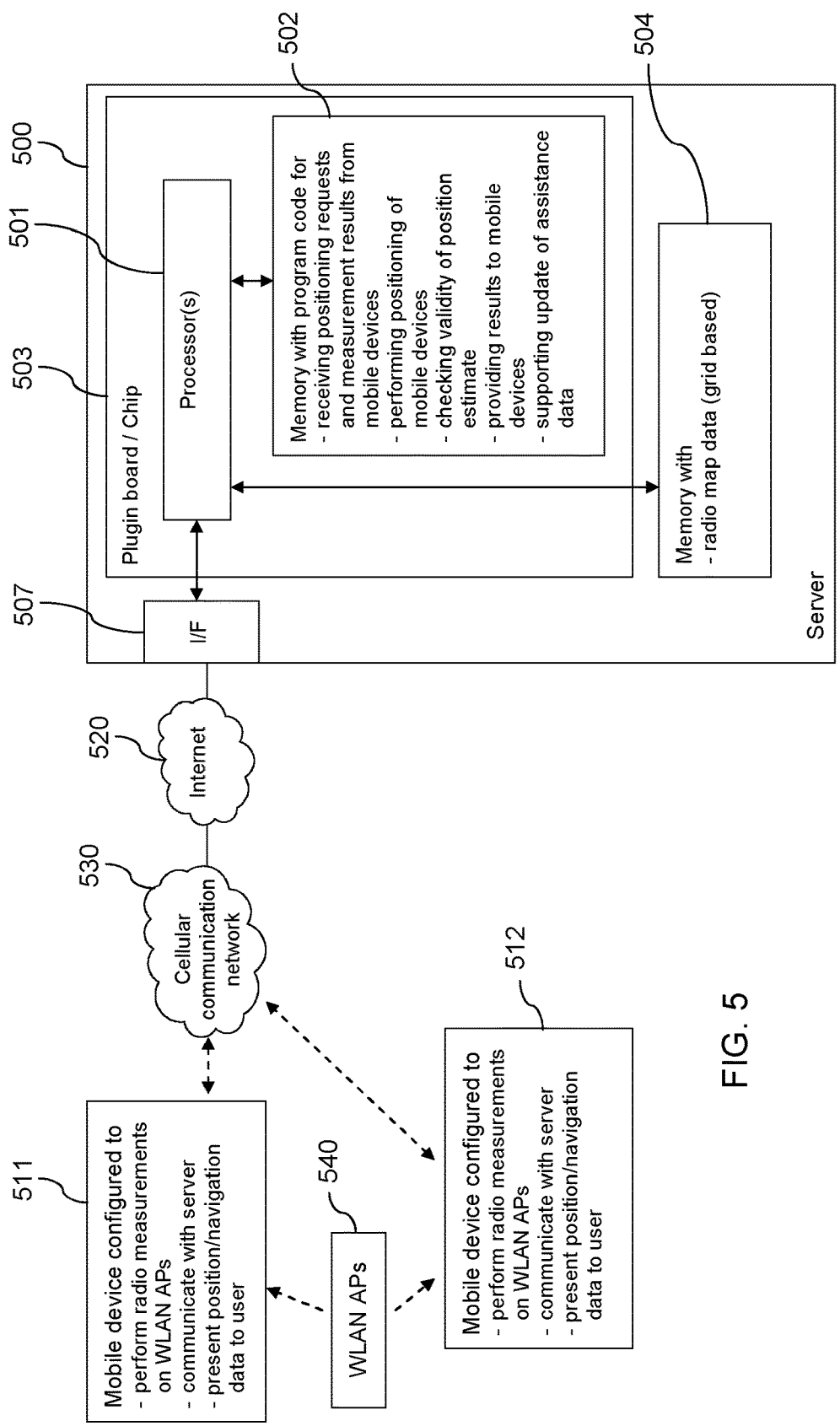
FIG. 5 is a schematic block diagram of a second example embodiment of a system.

FIG. 5 is a schematic block diagram of a second example embodiment of a system according to the invention. In this case, a server is configured to validate estimated positions of mobile devices.

The system comprises a server 500 and a plurality of mobile devices 511, 512. The system further comprises a network 520, by way of example the Internet. The system further comprises a cellular communication network 530 that is connected to the Internet 520. The system further comprises a number of WLAN access points 540.

Server 500 may be for instance a server that is provided specifically for performing positioning computations for mobile devices 511, 512 based on information about WLAN access points 540 detected by the mobile devices 511, 512 and on stored radio map data. Alternatively, it could be a learning and positioning server which also takes care of generating and updating radio map data for a WLAN based positioning, or it could be any other server. Server 500 comprises a processor 501 that is linked to a first memory 502, to a second memory 504 and to an interface (I/F) 507.

Processor 501 is configured to execute computer program code, including computer program code stored in memory 502, in order to cause server 500 to perform desired actions.

Memory 502 stores computer program code for performing a positioning of mobile devices 511, 512 upon request based on results of measurements on radio signals provided by the mobile devices 511, 512 and on stored radio map data, computer program code for validating estimated positions, and computer program code for providing results of the computations to the requesting mobile devices 511, 512. Some of the program code may be similar to the program code stored in memory 102. In addition, memory 502 could store computer program code configured to realize other functions, for instance for providing stored assistance data to mobile devices upon request or for supporting an update of assistance data. In addition, memory 502 could also store other kind of data.

Processor 501 and memory 502 may optionally belong to a plug-in board or a chip with an integrated circuit 503, which may comprise in addition various other components, for instance a further processor or memory.

Memory 504 is configured to store positioning assistance data on a per site basis. It is configured to store for example data of a grid based radio map for each of a plurality of geographical sites. The grid data can be obtained in different ways, as described with reference to server 310 of FIG. 3. In addition, memory 504 could store other data, for instance path loss model data, etc. It is to be understood that the data of memory 504 could also be distributed to several memories, which may be partly or completely external to server 500. For example, all or part of the data could be stored at an external memory that is accessible via another server.

Interface 507 is a component which enables server 500 to communicate with other devices, like mobile device 511 and 512, via networks 520 and 530. It could also enable server 500 to communicate with other entities, like other servers or terminals of staff of a positioning service provider operating server 500. Interface 507 could comprise for instance a TCP/IP socket.

It is to be understood that server 500 could comprise various other components.

Component 503 or server 500 could be an example embodiment of an apparatus according to the invention.

Mobile devices 511, 512 may be for instance mobile terminals, like smartphones or tablet PCs. They are configured to perform radio measurements on WLAN access points 540, to communicate with server 500, to perform for instance navigation computations, and to present a position of the mobile device 511, 512 and/or routing information to a user.

Cellular communication network 530 could be again any kind of cellular communication network.

The WLAN access points 540 could be again access points of one or more WLANs and constitute example transmitters according to the invention. The WLAN or WLANs may but do not have to be connected to the Internet 520.

An example operation in the system of FIG. 5 may be similar to the operations in the system of FIG. 3 described with reference to FIG. 4, except that a download of assistance data (action 401) is not required and that most of the other actions are performed at server 500 instead of at a mobile device.

Such an example operation will thus be briefly described with reference to FIG. 4 as well.

Processor 501 and some of the program code stored in memory 502 may cause server 500 of FIG. 5 to perform the actions performed by server 500 when program code is retrieved from memory 502 and executed by processor 501.

When an application running for instance on mobile device 511 needs to know the current position of mobile device 511, it may transmit a positioning request to server 500. In addition, it may trigger a measurement of radio signals transmitted by WLAN access points 504 as described with reference to action 402 and transmit the measurement results to server 500. The provided measurement results may include RSS values and associated WLAN access point identifiers for a current location of measurement. The data is transmitted to server 500 via cellular communication network 530 and the Internet 520.

Server 500 receives the positioning request and the measurement results on radio signals of WLAN access points from mobile device 511 and initiates performance of actions 403 to 415 described with reference to FIG. 4 by server 500.

The result comprises again a position estimate, a scaled, valid covariance for the position estimate, and—if optional action 414 is included—an indication whether or not the position estimate is valid. All or part of this result may be transmitted to the requesting mobile device 511 in action 415. In addition, it may be used internally by server 500 and/or transmitted to some other server for evaluation in action 415.

Mobile device 511 receives the data and uses the data as input for an application that needs a reliable position of mobile device 511 and/or a position along with a valid covariance for its operation. It could be, for instance, any application of the type as described above with reference to action 415. Mobile device 511 may then present information determined by the application for presentation to a user on a display.

Another operation of apparatus 100 will now be described with reference to the flow chart of FIG. 6. The operation is an example embodiment of a method according to the second aspect of the invention (and optionally the first aspect of the invention). Processor 101 and the program code stored in memory 102 cause an apparatus to perform the operation when the program code is retrieved from memory 102 and executed by processor 101. The apparatus that is caused to perform the operation may be apparatus 100 or some other apparatus, for example but not necessarily a device comprising apparatus 100.

The apparatus obtains results of measurements by a mobile device on radio signals transmitted by a plurality of transmitters, the results of measurements comprising characteristics of the radio signals at the location of measurement. (action 601) This may be realized for example in the same manner as described with reference to action 201 of FIG. 2 or actions 402 and 403 of FIG. 4, or using any suitable variation.

The apparatus furthermore estimates a position of the mobile device based on the obtained results of measurements and based on assistance data including information on expected characteristics of radio signals of various transmitters at various locations. (action 602) This may be realized for example in the same manner as described with reference to action 202 of FIG. 2 or action 404 of FIG. 4, or using any suitable variation.

The apparatus furthermore determines matching transmitters for which characteristics of radio signals are available in the results of measurements and for which information on expected characteristics of radio signals at the estimated position are available in the assistance data. (action 603) This may be realized for example in the same manner as described with reference to action 403 of FIG. 4, or using any suitable variation.

The apparatus furthermore determines a distribution of characteristics of radio signals of the matching transmitters at the estimated position based on the information on expected characteristics of radio signals of the matching transmitters in the assistance data to obtain an expected distribution for the matching transmitters. (action 604) This may be realized for example in the same manner as described with reference to action 406 of FIG. 4, or using any suitable variation.

The apparatus furthermore matches the determined expected distribution for the matching transmitters with a predetermined reference distribution of characteristics of radio signals. (action 605)

The predetermined reference distribution may be obtained for example in the same manner as described with reference to action 408 of FIG. 4, or using any suitable variation.

In an example embodiment, the matching may comprise computing a covariance of the distribution values for matching transmitters, for instance in the same manner as described with reference to action 407 of FIG. 4 or using any suitable variation, and obtaining a predetermined reference covariance for the predetermined reference distribution values, for instance in the same manner as described with reference to action 408 of FIG. 4 or using any suitable variation. It may further comprise computing a probability density function based on the distribution values for the matching transmitters, the predetermined reference distribution values and the predetermined reference covariance, for example similarly as described with reference to action 410 of FIG. 4 just substituting the computed distribution values for the matching transmitters for the estimated distribution values. It may further comprise computing a scaling constant based on the probability density function, for instance in the same manner as described with reference to action 411 of FIG. 4 or using any suitable variation. It may further comprise scaling the covariance of the distribution values for the matching transmitters using the computed scaling constant to obtain a valid covariance of the estimated position, for example similarly as described with reference to action 413 of FIG. 4 just substituting the computed covariance of the distribution values for the matching transmitters for the estimated covariance. The resulting valid covariance of the estimated position may then be compared to a threshold, for instance in the same manner as described with reference to action 414 of FIG. 4, to obtain a result of the matching.

In an optional action, which is only used in case the example operation is to combine the first and the second aspect of the invention, the apparatus furthermore matches a distribution of characteristics of radio signals in the obtained results of measurements with a reference distribution of characteristics of radio signals. (action 606) If this action is present, it may be performed for instance in any manner described above for the first aspect. The reference distribution in this action could thus correspond for example either to the expected distribution determined in action 604 or to the predetermined reference distribution used in action 605.

The apparatus furthermore provides a result of the matching as an indication of validity of the estimated position. (action 607) This may be realized for example in the same manner as described with reference to action 204 of FIG. 2 or action 415 of FIG. 4, or using any suitable variation.

Certain embodiments of the invention thus provide that the expected distribution of characteristics of radio signals from transmitters from which radio signals are detected by a mobile device is matched with a predetermined reference distribution, in order to obtain information on the validity of a position that has been estimated based on radio signals from these transmitters detected at the mobile device.

These embodiments of the invention may equally have the effect that they enable a validation of an estimated position and/or that they ensure that certain applications that rely on accurate position information can be provided only with position information that can be assumed to be valid and/or that they ensure that certain applications receive reliable information on a position, like a position estimate along with reliable uncertainty values and/or that they allow improving the overall performance of such applications and/or the user experience with such applications. In certain embodiments of the second aspect of the invention, the result of the matching may equally be considered to quantify the effectiveness of assistance data for a particular radio scan, i.e. for results of measurements by a mobile device at a particular measurement location.

As indicated before, actions 601 to 605 and action 607 could be used in a stand-alone fashion. That is, in terms of validation of an estimated position, the results of measurements by a mobile device may only be used for detecting which matching transmitters are available in assistance data, like a radio map, and then a distribution may be obtained from the assistance data, and the distribution may be matched with a reference distribution (prior distribution), e.g. for calculation of a probability.

However, if action 606 is present, the matching actions 605 and 606 may invalidate the position estimated in action 602 in different conditions. If any one of the approaches invalidates the position estimate then the position estimate is considered as invalid for action 607.

It is to be understood that any variation presented for example embodiments of the first aspect can also be used in an analogue manner for example embodiments of the second aspect.

It is further to be understood that any of the presented example apparatuses, systems and operations may be varied in many ways. The operations may be varied for instance by modifying actions, by omitting actions and/or by adding actions. In addition, the order of actions could be modified.

For example, the estimated covariance computed in action 412 of FIG. 4 could also be computed at any other instance between the computation of the required estimated distribution values in action 405 of FIG. 4 and the scaling of the estimated covariance in action 413 of FIG. 4.

For example, if action 606 is included in the operation of FIG. 4, in some embodiments it may only be performed in case the matching of action 605 results in the assumption that the estimated position is valid.

For example, the assistance data could not only be grid based radio map data comprising radio signal strength values; it may be of any form that enables a positioning of a mobile device at a particular site based on results of measurements on radio signals and that allows determining for an estimated position corresponding expected characteristics of radio signals for various transmitters. In a possible variation, timing advance values may be mapped to grid points of a grid instead of radio signal strength values.

For example, in an alternative embodiment, the radio signals on which measurements are performed by mobile devices in the systems of FIG. 3 or 5 could include signals of other transmitters instead of or in addition to WLAN access point signals, in particular signals of other non-cellular terrestrial communication nodes.

Summarized, certain embodiments of the invention may have the effect that they allow validating an estimated position of a mobile device and consequently improving the performance of an application that relies on the use of valid positions or at least on information on the validity of estimated positions. The information may be generated at a mobile device or at a server and it may be exploited in various ways at a mobile device and/or at a server.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 7:
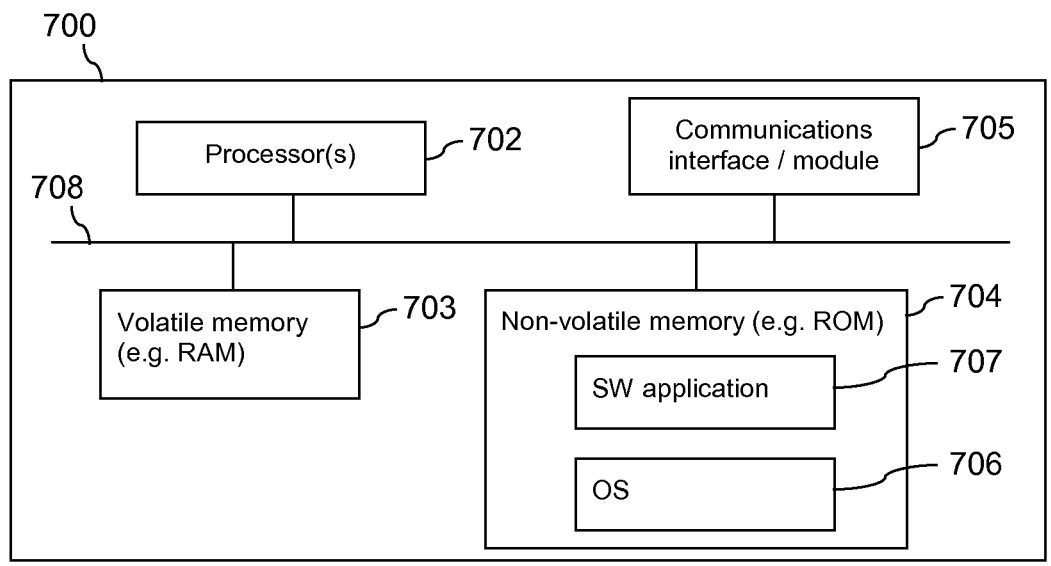
FIG. 7 is a schematic block diagram of an example embodiment of an apparatus.
Figure 8:
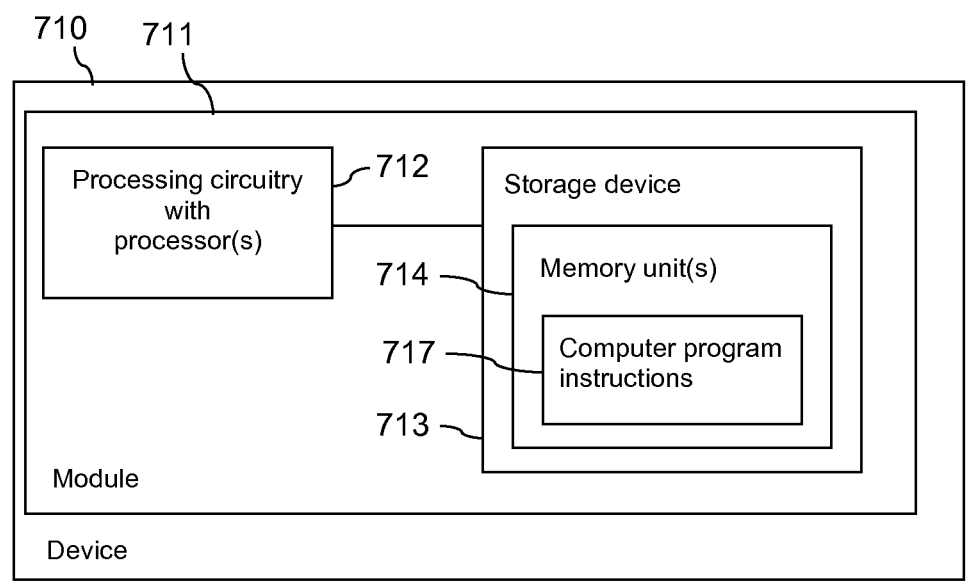
FIG. 8 is a schematic block diagram of an example embodiment of an apparatus.

Example embodiments using at least one processor and at least one memory as a non-transitory data medium are shown in FIGS. 7 and 8.

FIG. 7 is a schematic block diagram of a device 700. Device 700 includes a processor 702. Processor 702 is connected to a volatile memory 703, such as a RAM, by a bus 708. Bus 708 also connects processor 702 and RAM 703 to a non-volatile memory 704, such as a ROM. A communications interface or module 705 is coupled to bus 708, and thus also to processor 702 and memories 703, 704. Within ROM 704 is stored a software (SW) application 707. Software application 707 may be a positioning application, although it may take some other form as well. An operating system (OS) 706 also is stored in ROM 704.

FIG. 8 is a schematic block diagram of a device 710. Device 710 may take any suitable form. Generally speaking, device 710 may comprise processing circuitry 712, including one or more processors, and a storage device 713 comprising a single memory unit or a plurality of memory units 714. Storage device 713 may store computer program instructions 717 that, when loaded into processing circuitry 712, control the operation of device 710. Generally speaking, also a module 711 of device 710 may comprise processing circuitry 712, including one or more processors, and storage device 713 comprising a single memory unit or a plurality of memory units 714. Storage device 713 may store computer program instructions 717 that, when loaded into processing circuitry 712, control the operation of module 711.

The software application 707 of FIG. 7 and the computer program instructions 717 of FIG. 8, respectively, may correspond e.g. to the computer program code in any of memories 102, 302 or 502, respectively.

Figure 9:
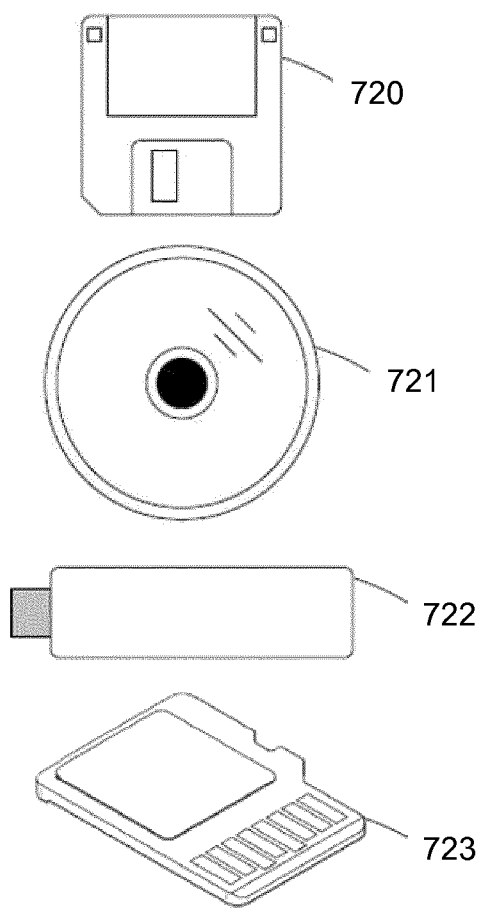
FIG. 9 schematically illustrates example removable storage devices.

In example embodiments, any non-transitory computer readable medium mentioned in this text could also be a removable/portable storage or a part of a removable/portable storage instead of an integrated storage. Example embodiments of such a removable storage are illustrated in FIG. 9, which presents, from top to bottom, schematic diagrams of a magnetic disc storage 720, of an optical disc storage 721, of a semiconductor memory circuit device storage 722 and of a Micro-SD semiconductor memory card storage 723.

The functions illustrated by processor 101 in combination with memory 102, or processor 301 in combination with memory 302, or the integrated circuit 303, or processor 501 in combination with memory 502, or the chip 503 can also be viewed as means for obtaining results of measurements by a mobile device on radio signals transmitted by a plurality of transmitters, the results of measurements comprising characteristics of the radio signals at the location of measurement; means for estimating a position of the mobile device based on the obtained results of measurements and based on assistance data including information on expected characteristics of radio signals of various transmitters at various locations; means for matching a distribution of characteristics of radio signals in the obtained results of measurements with a reference distribution of characteristics of radio signals; and means for providing a result of the matching as an indication of validity of the estimated position.

The program codes in memories 102, 302 and 502 can also be viewed as comprising such means in the form of functional modules.

FIGS. 2 and 4 may also be understood to represent example functional blocks of computer program codes supporting a validation of an estimated position in accordance with the first aspect of the invention.

The functions illustrated by processor 101 in combination with memory 102 can also be viewed as means for obtaining results of measurements by a mobile device on radio signals transmitted by a plurality of transmitters, the results of measurements comprising characteristics of the radio signals at the location of measurement; means for estimating a position of the mobile device based on the obtained results of measurements and based on assistance data including information on expected characteristics of radio signals of various transmitters at various locations; means for determining matching transmitters for which characteristics of radio signals are available in the results of measurements and for which information on expected characteristics of radio signals at the estimated position are available in the assistance data; means for determining a distribution of characteristics of radio signals of the matching transmitters at the estimated position based on the information on expected characteristics of radio signals of the matching transmitters in the assistance data to obtain an expected distribution for the matching transmitters; means for matching the determined expected distribution for the matching transmitters with a predetermined reference distribution of characteristics of radio signals; and means for providing a result of the matching as an indication of validity of the estimated position.

The program codes in memory 102 can also be viewed as comprising such means in the form of functional modules.

Figure 6:
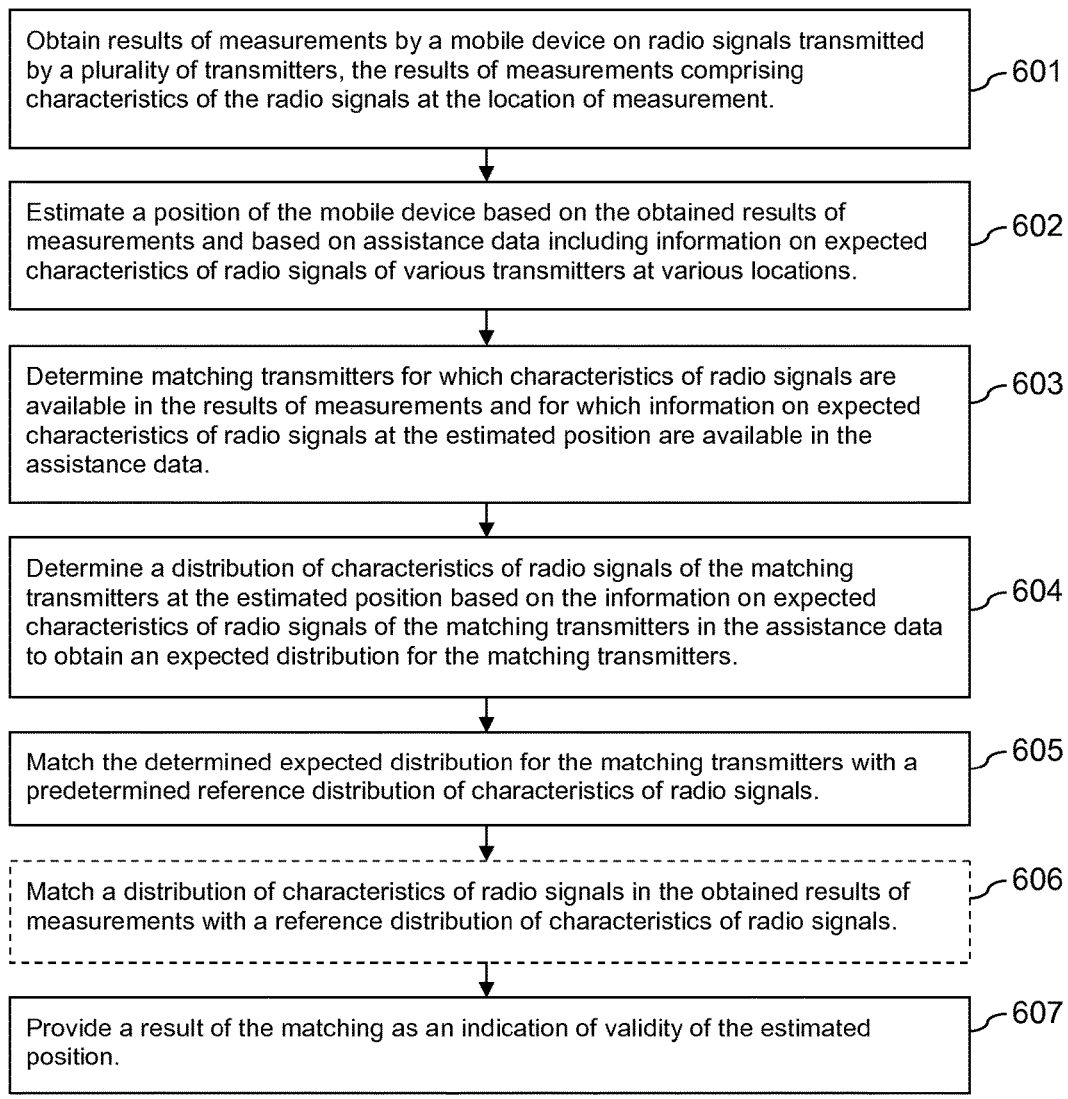
FIG. 6 is a flow chart illustrating an example embodiment of a method according to the second aspect.

FIG. 6 may also be understood to represent example functional blocks of computer program codes supporting a validation of an estimated position in accordance with the second aspect of the invention.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

What is claimed is:

1. A method comprising, performed by at least one apparatus:
    obtaining results of measurements by a mobile device on radio signals transmitted by a plurality of transmitters, the results of measurements comprising characteristics of the radio signals at the location of measurement;
    estimating a position of the mobile device based on the obtained results of measurements and based on assistance data including information on expected characteristics of radio signals of various transmitters at various locations;
    matching a distribution of characteristics of radio signals in the obtained results of measurements with a reference distribution of characteristics of radio signals; and
    providing a result of the matching as an indication of validity of the estimated position.

2. The method according to claim 1, wherein the reference distribution is defined by one of:
    predetermined global distribution values for a plurality of geographical sites; or
    predetermined distribution values for a particular geographical site; or
    predetermined distribution values for a particular geographical location corresponding to the estimated position; or
    distribution values computed for expected characteristics of radio signals of selected transmitters at the estimated position, the selected transmitters being transmitters for which characteristics are included in the results of measurement.

3. The method according to claim 1, wherein the distribution of characteristics of radio signals in the obtained results of measurements is defined by a mean of the characteristics and a standard deviation of the characteristics, and wherein the reference distribution of characteristics of radio signals is defined by a reference mean and a reference standard deviation.

4. The method according to claim 1, wherein matching a distribution of characteristics of radio signals in the results of measurements with a reference distribution comprises:
    determining matching transmitters for which characteristics are available in the results of measurements and for which information on expected characteristics at the estimated position are available in the assistance data;
    computing distribution values for the characteristics of radio signals of the matching transmitters from the results of measurements to obtain estimated distribution values;
    computing distribution values for characteristics of radio signals of the matching transmitters based on the information on expected characteristics of the matching transmitters at the estimated position in the assistance data to obtain reference distribution values;
    computing a covariance of the reference distribution values to obtain a reference covariance;
    computing a probability density function based on the estimated distribution values, the reference distribution values and the reference covariance;
    computing a scaling constant based on the probability density function;
    computing a covariance of the estimated distribution values; and
    scaling the covariance of the estimated distribution values using the computed scaling constant to obtain a valid covariance of the estimated position;
    or wherein matching a distribution of characteristics of radio signals in the results of measurements with a reference distribution comprises:
    determining matching transmitters for which characteristics are available in the results of measurements and for which information on expected characteristics at the estimated position are available in the assistance data;
    computing distribution values for the characteristics of radio signals of the matching transmitters from the results of measurements to obtain estimated distribution values;
    obtaining predetermined reference distribution values for characteristics of radio signals;
    obtaining a predetermined reference covariance for the reference distribution values;
    computing a probability density function based on the estimated distribution values, the reference distribution values and the reference covariance;
    computing a scaling constant based on the probability density function;
    computing a covariance of the estimated distribution values; and scaling the covariance of the estimated distribution values using the computed scaling constant to obtain a valid covariance of the estimated position.

5. The method according to claim 4,
wherein providing a result of the matching as an indication on the quality of the estimated position comprises providing the valid covariance; and/or
further comprising determining whether the estimated position is valid by comparing the valid covariance with a threshold, wherein providing a result of the matching as an indication of validity of the estimated position comprises providing a result of the comparison.

6. The method according to claim 1, further comprising:
determining matching transmitters for which characteristics of radio signals are available in the results of measurements and for which information on expected characteristics at the estimated position are available in the assistance data;
determining a distribution of characteristics of radio signals of the matching transmitters at the estimated position based on the information on expected characteristics of radio signals of the matching transmitters in the assistance data to obtain an expected distribution for the matching transmitters;
matching the determined expected distribution for the matching transmitters with a predetermined reference distribution of characteristics of radio signals to obtain a result of further matching; and
combining the result of the matching with the result of the further matching to obtain the provided indication of validity of the estimated position.

7. The method according to claim 1, wherein the plurality of transmitters comprises at least one of:
at least one terrestrial transmitter; and/or
at least one terrestrial cellular transmitter; and/or
at least one terrestrial non-cellular transmitter; and/or
at least one access point of at least one wireless local area network; and/or
at least one Bluetooth transmitter; and/or
at least one Bluetooth low energy transmitter.

8. The method according to claim 1, wherein a result of the matching as an indication of validity of the estimated position is provided at least one of:
for transmission; and/or
for use in the apparatus; and/or
for use by an application; and/or
for use by an application combining information from different sensors; and/or
for supporting an assembly of assistance data.

9. The method according to claim 1, wherein the at least one apparatus is or belongs to one of:
the at least one mobile device; or
a server that is configured to obtain the results of measurements from the mobile device.

10. A method comprising, performed by at least one apparatus:
obtaining results of measurements by a mobile device on radio signals transmitted by a plurality of transmitters, the results of measurements comprising characteristics of the radio signals at the location of measurement;
estimating a position of the mobile device based on the obtained results of measurements and based on assistance data including information on expected characteristics of radio signals of various transmitters at various locations;
determining matching transmitters for which characteristics of radio signals are available in the results of measurements and for which information on expected characteristics of radio signals at the estimated position are available in the assistance data;
determining a distribution of characteristics of radio signals of the matching transmitters at the estimated position based on the information on expected characteristics of radio signals of the matching transmitters in the assistance data to obtain an expected distribution for the matching transmitters;
matching the determined expected distribution for the matching transmitters with a predetermined reference distribution of characteristics of radio signals; and
providing a result of the matching as an indication of validity of the estimated position.

11. An apparatus comprising at least one processor and at least one memory including computer program code, the at least one memory and the computer program code configured to, with the at least one processor, cause the apparatus at least to perform:
obtain results of measurements by a mobile device on radio signals transmitted by a plurality of transmitters, the results of measurements comprising characteristics of the radio signals at the location of measurement;
estimate a position of the mobile device based on the obtained results of measurements and based on assistance data including information on expected characteristics of radio signals of various transmitters at various locations;
match a distribution of characteristics of radio signals in the obtained results of measurements with a reference distribution of characteristics of radio signals; and
provide a result of the matching as an indication of validity of the estimated position.

12. The apparatus according to claim 11, wherein the reference distribution is defined by one of:
predetermined global distribution values for a plurality of geographical sites; or
predetermined distribution values for a particular geographical site; or
predetermined distribution values for a particular geographical location corresponding to the estimated position; or
distribution values computed for expected characteristics of radio signals of selected transmitters at the estimated position, the selected transmitters being transmitters for which characteristics are included in the results of measurement.

13. The apparatus according to claim 11, wherein the distribution of characteristics of radio signals in the obtained results of measurements is defined by a mean of the characteristics and a standard deviation of the characteristics, and wherein the reference distribution of characteristics of radio signals is defined by a reference mean and a reference standard deviation.

14. The apparatus according to claim 11, wherein matching a distribution of characteristics of radio signals in the results of measurements with a reference distribution comprises:
determining matching transmitters for which characteristics are available in the results of measurements and for which information on expected characteristics at the estimated position are available in the assistance data;

computing distribution values for the characteristics of radio signals of the matching transmitters from the results of measurements to obtain estimated distribution values;

computing distribution values for characteristics of radio signals of the matching transmitters based on the information on expected characteristics of the matching transmitters at the estimated position in the assistance data to obtain reference distribution values;

computing a covariance of the reference distribution values to obtain a reference covariance;

computing a probability density function based on the estimated distribution values, the reference distribution values and the reference covariance;

computing a scaling constant based on the probability density function;

computing a covariance of the estimated distribution values; and scaling the covariance of the estimated distribution values using the computed scaling constant to obtain a valid covariance of the estimated position;

or wherein matching a distribution of characteristics of radio signals in the results of measurements with a reference distribution comprises:

determining matching transmitters for which characteristics are available in the results of measurements and for which information on expected characteristics at the estimated position are available in the assistance data;

computing distribution values for the characteristics of radio signals of the matching transmitters from the results of measurements to obtain estimated distribution values;

obtaining predetermined reference distribution values for characteristics of radio signals;

obtaining a predetermined reference covariance for the reference distribution values;

computing a probability density function based on the estimated distribution values, the reference distribution values and the reference covariance;

computing a scaling constant based on the probability density function;

computing a covariance of the estimated distribution values; and scaling the covariance of the estimated distribution values using the computed scaling constant to obtain a valid covariance of the estimated position.

15. The apparatus according to claim 14, wherein providing a result of the matching as an indication on the quality of the estimated position comprises providing the valid covariance; and/or wherein the computer program code is further configured to, with the at least one processor, cause the apparatus to determine whether the estimated position is valid by comparing the valid covariance with a threshold, and wherein providing a result of the matching as an indication of validity of the estimated position comprises providing a result of the comparison.

16. The apparatus according to claim 11, wherein the computer program code is further configured to, with the at least one processor, cause the apparatus to determine matching transmitters for which characteristics of radio signals are available in the results of measurements and for which information on expected characteristics at the estimated position are available in the assistance data;

determine a distribution of characteristics of radio signals of the matching transmitters at the estimated position based on the information on expected characteristics of radio signals of the matching transmitters in the assistance data to obtain an expected distribution for the matching transmitters;

match the determined expected distribution for the matching transmitters with a predetermined reference distribution of characteristics of radio signals to obtain a result of further matching; and combine the result of the matching with the result of the further matching to obtain the provided indication of validity of the estimated position.

17. The apparatus according to claim 11, wherein the characteristics of the radio signals in the results of the measurements and the expected characteristics comprise at least one of signal strength related values and timing advance related values.

18. The apparatus according to claim 11, wherein the plurality of transmitters comprises at least one of:
at least one terrestrial transmitter; and/or
at least one terrestrial cellular transmitter; and/or
at least one terrestrial non-cellular transmitter; and/or
at least one access point of at least one wireless local area network; and/or
at least one Bluetooth transmitter; and/or
at least one Bluetooth low energy transmitter.

19. The apparatus according to claim 11, wherein a result of the matching as an indication of validity of the estimated position is provided at least one of:
for transmission; and/or
for use in the apparatus; and/or
for use by an application; and/or
for use by an application combining information from different sensors; and/or
for supporting an assembly of assistance data.

20. The apparatus according to claim 11, wherein the apparatus is one of:
a chip; or
a module-for a server; or
a server; or
a module for a mobile device; or
a mobile device.

21. An apparatus comprising at least one processor and at least one memory including computer program code, the at least one memory and the computer program code configured to, with the at least one processor, cause the apparatus at least to perform:

obtain results of measurements by a mobile device on radio signals transmitted by a plurality of transmitters, the results of measurements comprising characteristics of the radio signals at the location of measurement;

estimate a position of the mobile device based on the obtained results of measurements and based on assistance data including information on expected characteristics of radio signals of various transmitters at various locations;

determine matching transmitters for which characteristics of radio signals are available in the results of measurements and for which information on expected characteristics of radio signals at the estimated position are available in the assistance data;

determine a distribution of characteristics of radio signals of the matching transmitters at the estimated position based on the information on expected characteristics of radio signals of the matching transmitters in the assistance data to obtain an expected distribution for the matching transmitters;

match the determined expected distribution for the matching transmitters with a predetermined reference distribution of characteristics of radio signals; and provide a result of the matching as an indication of validity of the estimated position.

22. A computer readable storage medium in which computer program code is stored, the computer program code causing an apparatus to perform the following when executed by a processor:

obtain results of measurements by a mobile device on radio signals transmitted by a plurality of transmitters, the results of measurements comprising characteristics of the radio signals at the location of measurement;

estimate a position of the mobile device based on the obtained results of measurements and based on assistance data including information on expected characteristics of radio signals of various transmitters at various locations;

match a distribution of characteristics of radio signals in the obtained results of measurements with a reference distribution of characteristics of radio signals; and provide a result of the matching as an indication of validity of the estimated position.

23. A computer readable storage medium in which computer program code is stored, the computer program code causing an apparatus to perform the following when executed by a processor:

obtain results of measurements by a mobile device on radio signals transmitted by a plurality of transmitters, the results of measurements comprising characteristics of the radio signals at the location of measurement;

estimate a position of the mobile device based on the obtained results of measurements and based on assistance data including information on expected characteristics of radio signals of various transmitters at various locations;

determine matching transmitters for which characteristics of radio signals are available in the results of measurements and for which information on expected characteristics of radio signals at the estimated position are available in the assistance data;

determine a distribution of characteristics of radio signals of the matching transmitters at the estimated position based on the information on expected characteristics of radio signals of the matching transmitters in the assistance data to obtain an expected distribution for the matching transmitters;

match the determined expected distribution for the matching transmitters with a predetermined reference distribution of characteristics of radio signals; and provide a result of the matching as an indication of validity of the estimated position.

* * * * *